United States Patent [19]
Woodier

[11] 3,966,313
[45] June 29, 1976

[54] FORWARD-REVERSE PROJECTOR MECHANISM

[75] Inventor: James G. Woodier, Morton Grove, Ill.

[73] Assignee: Bell & Howell Company, Chicago, Ill.

[22] Filed: July 2, 1975

[21] Appl. No.: 592,498

[52] U.S. Cl................................. 352/173; 352/194
[51] Int. Cl.².......................................... G03B 1/00
[58] Field of Search........... 352/191, 192, 193, 194, 352/195, 196, 173

[56] References Cited
UNITED STATES PATENTS
3,261,654   7/1966   Faber................................. 352/173

*Primary Examiner*—Monroe H. Hayes
*Attorney, Agent, or Firm*—Richard Gray; John E. Peele, Jr.

[57] ABSTRACT

The disclosure relates to a forward-reverse film transport synchronizing mechanism for a motion picture projector film feed apparatus of the type including a shuttle which is driven for vertical reciprocating motion by a transport cam. The mechanism of the present invention includes a rotary shutter which is driven by a rotating shaft and includes a pair of drive lugs arcuately spaced by 180° and axially spaced from one another. A transport cam drive means coupled to the transport cam and including a driven lug which is selectably engageable with one or the other drive lugs causes the transport cam to rotate when the rotating shaft rotates. Because the driven lug is selectably engageable with either of the drive lugs, the angular relation of the transport cam relative to the rotary shutter may be varied by 180° thus providing properly synchronized forward and reverse film transportation without requiring reversal of the angular direction of rotation of the rotating shaft.

11 Claims, 2 Drawing Figures

3,966,313

FORWARD-REVERSE PROJECTOR MECHANISM

BACKGROUND OF THE INVENTION

The present invention is directed to an improved film feed apparatus for use in a motion picture projector and particularly to a forward-reverse film transport synchronizing mechanism for a motion picture projector film feed apparatus.

Film feed mechanisms for use in motion picture projectors are well known in the art. Conventional mechanisms of this type may comprise a shuttle arranged for "up and down" or vertical reciprocation. The shuttle is also arranged for "in and out" reciprocation so that a tooth or teeth carried thereby will disengage a film strip at the end of each advancing stroke and engage with perforations in the film strip just prior to and during an indexing stroke. The shuttle is driven for vertical reciprocating motion by a transport cam against which the shuttle is disposed.

Such mechanism additionally includes a rotary shutter having a plurality of radially extending shutter blades, a given one of which covers the projector aperture during both forward and reverse projection. With many mechanisms of prior art, it has been necessary to reverse the direction of angular rotation of a shaft which is coupled to the transport cam and shutter to provide for properly synchronized forward and reverse film transportion. In other words, the direction of rotation of the rotating shaft is reversed so that the shuttle is caused to engage with the film during downward movement for forward projection as opposed to upward movement for reverse projection. When reversing the direction of film transporation, the same shutter blade covers the projection aperture. Because complicated gear arrangements are necessary for changing the angular direction of the rotating shaft, these systems are expensive.

It is therefore an object of the present invention to provide a new and improved motion picture projector film feed apparatus.

It is another object of the present invention to provide an improved forward-reverse film transport synchronizing mechanism for a motion picture projector film feed apparatus.

It is a more particular object of the present invention to provide a forward-reverse film transport synchronizing mechanism which is less complicated than those of the prior art in affording properly synchronized forward and reverse film transportation.

SUMMARY OF THE INVENTION

The invention in a film feed apparatus, for use in a motion picture projector, includes a shuttle which is driven by a film transporting cam wherein the shuttle has teeth for engaging perforations of a film to be transported and for transporting the film frames through a predetermined index stroke for bringing successive film frames into registration with the projector aperture, and wherein the transporting cam is mounted on and rotated in unison with a rotating shaft, a forward-reverse film transport synchronizing mechanism which affords properly synchronized forward and reverse film transportation while maintaining rotation of the rotating shaft in a single angular direction. The mechanism of the present invention comprises a rotary shutter mounted on the rotating shaft having an axis of rotation concentric with the axis of rotation of the rotating shaft and including a plurality of radially extending shutter blades, a given one of which is arranged for covering the aperture during both forward and reverse film transportation and additionally including first and second drive lugs arcuately spaced about the concentric axes by 180° and axially spaced along the concentric axes. The mechansim of the present invention additionally comprises transport drive means engaged with the transport cam and axially slideable between first and second positions on the rotating shaft and including a driven lug arranged to communicate with the first drive lug when the cam drive means is in the first position and to communicate with the second drive lugs when the cam drive means is in the second position for causing the transport cam to rotate when the shutter and rotating shaft rotate. As a result, with the cam drive means being slideable between the first and second positions, the communication between the driven lug and the first and second drive lugs is selectable to thus alter the angular relationship between the transport cam and the shutter by 180° to cause the film feed mechanism to transport the film in both forward and reverse directions and to be properly synchronized for both forward and reverse film transportation.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, and in the several figures of which like reference numerals indicate identical elements and in which:

DESCRIPTION OF THE PREFERRED EMBODIMENT

Referring now to the figures, the film feed apparatus there shown is of the type typically referred to as a "box" shuttle system characterized by a shuttle which is driven by a film transporting cam disposed for engagement thereby the shuttle has a tooth or teeth for engaging perforations of a film to be transported and for transporting the film frames through a predetermined index stroke for bringing successive film frames into registration with the aperture of a motion picture projector. Such film feed mechanisms are well known in the art and are fully described in Kim, U.S. Pat. No. 3,504,571 which issued Apr. 7, 1970 and in Thomsen et al, U.S. Pat. No. 3,758,047 which issued Sept. 11, 1975. Both of the aforementioned patents are assigned to the assignee of the present invention.

Figure 2:
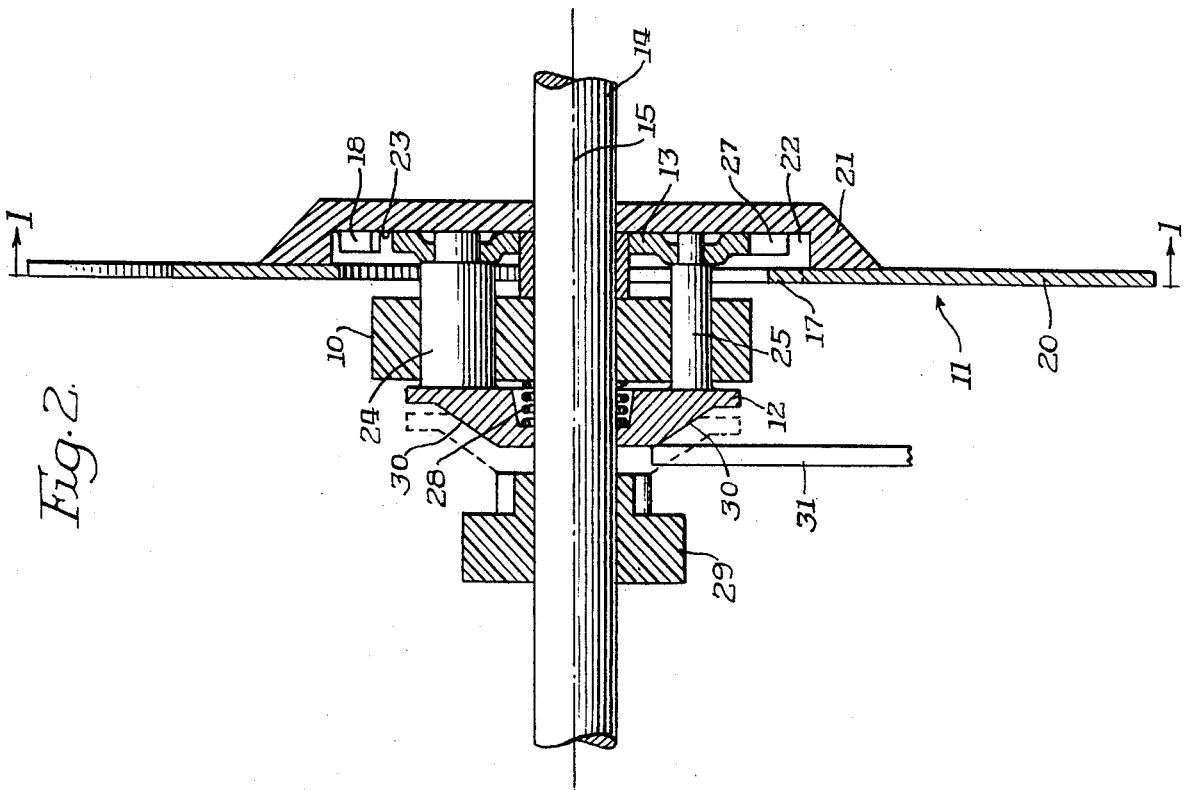
FIG. 2 is a cross-sectional view taken along lines 2—2 of FIG. 1, to an enlongated scale.
Figure 1:
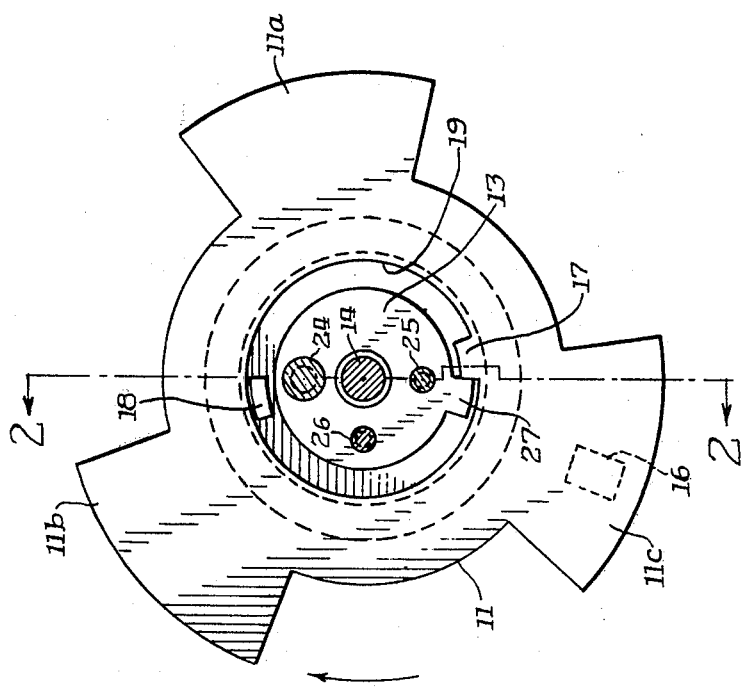
FIG. 1 is a part sectional and part elevational view of a film feed apparatus embodying the present invention, the view being taken on line 1—1 of FIG. 2.

The film feed apparatus of FIGS. 1 and 2 comprises a transport or pull down cam 10, a rotary shutter 11, a cam driver 12, a drive plate 13, and a rotating shaft 14. The rotating shaft 14 has an axis of rotation 15 and is directly coupled to the rotary shutter 11 having its axis of rotation concentric with the axis 15 so that when the rotating shaft 14 rotates, the shutter 11 rotates in unison with the rotating shaft.

The rotary shutter 11 includes three radially extending shutter blades 11a, 11b, and 11c. Shutter blade 11c as shown is covering the aperture 16 of the projector.

Shutter blade 11c covers the aperture 16 at its midpoint during the midpoint of the film transportation stroke for both forward and reverse directions. As well known in the art, to provide properly synchronized operation for both forward and reverse film transportation by a unidirectionally rotated drive, the angular relation between the rotary shutter 11 and the transport cam 10 must be altered by approximately 180° so that the shutter blade 11c will cover the aperture 16 substantially at its midpoint during both forward and reverse film transportation index stroke.

To this end, rotary shutter 11 includes a pair of drive lugs 17 and 18. As can best be seen in FIG. 1, shutter 11 includes a circular opening 19 in the center thereof and drive lug 17 comprises an inward radial extension from the inner periphery of circular opening 19.

Rotary shutter 11 also includes a first member 20 which includes the shutter blades, the circular opening, and drive lug 17, and a narrow generally cylindrical member 21 secured to the first member 20. Cylindrical member 21 includes a shallow circular recess 22 which is concentric with its outer periphery and having a diameter approximating the diameter of the circular opening 19.

The bottom of the circular recess 22 comprises a major surface 23, facing the first member 20, and includes the drive lug 18, which extends therefrom. The major surface 23 of recess 22 has a further function to be described hereinafter. Drive lug 17 is utilized during the forward projection mode and drive lug 18 is utilized during the reverse projection mode. Drive lug 17 and drive lug 18 are arcuately spaced about axis 15 with their respective engaging surfaces spaced by 180°, and are also axially spaced along axis 15.

The cam 10 is driven for rotational movement by the rotary shutter 11 through a transport cam drive means including the drive plate 13, the cam driver 12, and the coupling posts 24, 25 and 26. The drive plate 13 is mounted on the rotating shaft 14 and has an axis of rotation concentric with axis 15. Drive plate 13 is also slideable axially along rotating shaft 14. In a similar manner, the cam driver 12 is mounted on the rotating shaft 14 and has an axis of rotation concentric with axis 15 and is slideable for axial movement relative to transport cam 10 when drive plate 13 and cam driver 12 rotate.

Drive plate 13 is circular and has a driven lug 27 which is an outward radial extension of the drive plate. Drive plate 13 is slideable for axial movement on shaft 14 between first and second positions. In its first position, driven lug 27 is arranged for engagement with drive lug 17 for film transportation in the forward direction.

As shown in FIG. 2, drive plate 13 is in the second position whereby driven lug 27 is arranged for communicating with drive lug 18 for film transportation in the reverse direction. Major surface 23 serves to confine the actual movement of the drive plate 13 such that when drive plate abuts major surface 23 the drive plate is in the second position.

The transport drive means is spring loaded relative to the shutter 11 by means of a spring 28 which is mounted around shaft 14. Spring 28 acts upon cam 10 which is fixed axially relative to shutter 11 causing cam drive 12 to shift to the left until it abuts hub 29. In so doing, drive plate 13 to also shifted to the left to bring lug 27 into alignment with drive lug 17 for film transportation in the forward direction. Cam driver 12 is circular and also includes a ramped face surface 30 so that as the lever 31 is moved in a vertical direction the cam driver is moved axially along shaft 14. As shown in FIG. 2 and in the solid lines, the film feed mechanism is in the reverse transportation mode and as represented in dash lines, it is in the forward film transportation mode. Because of spring 28 acting upon cam driver 12, the film feed mechanism is normally in the forward film transportation mode.

In operation, if forward film transportation is desired, lever 31 is retracted allowing cam driver 12 to axially move along shaft 14 for abutment with hub 29. Cam driver 13 will also move axially along shaft 14 so that driven lug 27 is in alignment for engagement with forward drive lug 17 of rotary shutter 11. The rotating shaft is then rotated by a motor or other suitable means in the direction indicated by the arrow on FIG. 1. Because the rotary shutter is directly mounted to rotating shaft 15, the rotary shutter will also rotate causing drive lug 17 to engage driven lug 27. Drive plate 13 now rotates and causes transport pull down cam 10 to rotate for film transportation in the forward direction and in a properly synchronized manner such that the midpoint of shutter blade 11c covers aperture 16 at the midpoint of the forward film transportation index stroke.

For reverse film transportation, lever 31 is brought into engagement with the ramped surface 30 of cam driver 12 causing the cam driver to move axially along shaft 14 until drive plate 13 is in abutting relation with major surface 23 of the cylindrical member 21 of shutter 11. Driven lug 27 is now in alignment for engagement with the reverse drive lug 18. Rotating shaft 15 is once again rotated in the direction of the arrow of FIG. 1 causing drive lug 18 to impart rotational movement to drive plate 13 which in turn causes transport pull down cam 10 to rotate. Because drive lug 18 and drive lug 17 are arcuately spaced by 180°, the film feed mechanism is properly synchronized for reverse film transportation. Shutter blade 11c will cover aperture 16 at its midpoint during the midpoint of the reverse film feed index stroke.

Thus, the present invention provides a forward-reverse film transport synchronizing mechanism for a film feed apparatus which allows both forward and reverse film transportation to occur in a properly synchronized manner. The invention also provides a mechanism for allowing properly synchronized forward and reverse film transportation without requiring the expensive and complicated mechanical arrangements heretofore necessary wherein the rotating shaft was reversed in rotational angular direction for accomplishing properly synchronized forward and reverse film transportation.

While a particular embodiment of the invention has been shown and described, modifications may be made, and it is intended in the appended claims to cover all such modifications as may fall within the true spirit and scope of the invention.

What I claim is:

1. In a film feed apparatus for use in a motion picture projector and of the type which includes a shuttle which is driven by a film transporting cam disposed for engagement thereby, the shuttle having teeth for engaging perforations of a film to be transported and for transporting the film frames through a predetermined index stroke for bringing successive frames into registration with the projector aperture, and the transporting cam being mounted on and rotated in unison with a rotatable shaft, a forward-reverse film transport synchronizing mechanism which affords properly synchronized forward and reverse film transportation while maintaining rotating of the rotatable shaft in a single angular direction comprising:

a rotary shutter mounted in fixed axial and radial relation on the rotatable shaft with an axis of rotation concentric with the axis of rotation of the rotatable shaft and including a plurality of radially extending shutter blades, a given one of which is arranged for covering the aperture during both forward and reverse film transportation and additionally including first and second drive lugs arcuately spaced about said concentric axis by 180° and axially spaced along said concentric axes; and transport cam drive means engaged with said transport cam and axially slideable between first and second positions on said rotating shaft, which cam drive means includes a driven lug positioned on said cam drive means so as to communicate with said first drive lug on said shutter when said cam drive means is in said first position and to communicate with said second drive lug on said shutter when said cam drive means is in said second position for causing said transport cam to rotate when said shutter and rotating shaft rotate; whereby with said cam drive means being slideable between said first and second positions, the communication between said driven lug and said first and second drive lugs is selectable to thus alter the angular relationship between said transport cam and said shutter by 180° to cause the film feed mechanism to transport the film in both forward and reverse directions and to be properly synchronized for both forward and reverse film transportation.

2. A mechanism in accordance with claim 1 wherein said cam drive means includes a circular drive plate mounted about the rotating shaft and wherein said driven lug comprises an outward radial extension of said drive plate.

3. A mechanism in accordance with claim 2 wherein said rotary shutter includes a circular opening in the center thereof and wherein said first drive lug comprises an inward radial extension from said circular opening.

4. A mechanism in accordance with claim 3 wherein said rotary shutter comprises a first member which includes said shutter blades, said circular opening, and said first drive lug and wherein a narrow cylindrical member is secured to said first member having a shallow circular recess concentric with the outer periphery of said cylindrical member and having a diameter approimxating the diameter of said circular opening.

5. A mechanism in accordance with claim 4 wherein the bottom of said circular recess comprises a major surface facing said first member, said major surface including said second driven lug and confining the axial movement of said drive plate so that when said drive plate abuts said major surface said second driven lug is in communicating alignment with said second drive lug.

6. A mechanism in accordance with claim 5 wherein said transport cam drive means further comprises a generally circular cam driver mounted on said rotating shaft on the side of said transport cam opposite said drive plate with a plurality of coupling members passing through said transport cam and terminating at and secured to said drive plate so that as said drive plate is rotated by said shutter, said cam driver causes said transport cam to rotate and as said drive plate is rotated and axially moved along said shaft between engagement with said first and second drive lug the angular relation between said transport cam and said shutter is altered by 180°.

7. A mechanism in accordance with claim 6 wherein at least one of said coupling means is in continuous contact with said transport cam.

8. A mechanism in accordance with claim 6 wherein said cam driver is spring loaded relative to said shutter for urging said first drive lug to a position where it is normally in communicating alignment with said driven lug.

9. A mechanism in accordance with claim 8 wherein said shutter and said transport cam are fixed relative to one another in the axial direction and wherein said cam driver is spring loaded relative to said shutter by a spring on said rotating shaft between said transport cam and said cam driver.

10. A mechanism in accordance with claim 9 further comprising a lever and wherein said cam driver includes a ramped face surface, said lever being aligned for engaging said ramped surface to thereby cause said cam driver to more in an axial direction along said rotating shaft and to shift said drive plate between said first and second positions.

11. In a film feed apparatus for use in a motion picture projector of the type which includes a shuttle which is driven by a film transporting cam disposed for engagement thereby, the shuttle having teeth for engaging perforations of a film to be transported and for transporting the film frames through a predetermined index stroke for bringing successive frames into registration with the projector aperture, and the transporting cam being mounted on and rotated in unison with a rotatable shaft;

a forward-reverse film transport synchronizing mechanism which affords properly synchronized forward and reverse film transportation while maintaining rotating of the rotatable shaft in a single angular direction which mechanism includes:

a rotary shutter forming means mounted in fixed axial and radial relation on said rotatable shaft with an axis of rotation concentric with the axis of rotation of said rotatable shaft and having a plurality of radially extending shutter blades, a given one of which is arranged for covering the projector aperture during both forward and reverse film transporation, said shutter forming means including first and second drive lugs arcuately spaced about said concentric axis by 180° and axially spaced along said concentric axis;

said shutter forming means having a shallow circular recess with an opening in the direction of said film transporting cam and having the axis thereof concentric with the axis of said rotatable shaft, one of said drive lugs being disposed in said recess; and transport cam drive means engaged with said transport cam and axially slidable between first and second positions on said rotating shaft, which cam drive means includes a drive plate member disposed in axially slidable relation in said recess of said shutter forming means and having thereon a driven lug positioned so as to communicate with said first drive lug on said shutter forming means when said cam drive means is in said first position and to communicate with said second drive lug on said shutter forming means when said cam drive means is in said second position for causing said transport cam to rotate with said shutter forming means and said rotating shaft;

said cam drive means being slidable on said shaft between said first and second positions, and having co-operating means for selectably sliding said cam drive means between said first and second positions so as to establish communication selectively between said driven lug and said first and second drive lugs on said shutter forming means and to thus alter the angular relationship between said transport cam and said shutter forming means by 180° so as to cause the film feed mechanism to transport the film in both forward and reverse directions and to be properly synchronized for both forward and reverse film transportation.

* * * * *